June 28, 1966  R. W. EWING, JR  3,258,516
PRODUCTION OF POLYMERIC FILM
Filed Sept. 28, 1961  2 Sheets-Sheet 1

INVENTOR
ROBERT WICKLIFFE EWING, JR.

BY *A. Ralph Snyder*
ATTORNEY

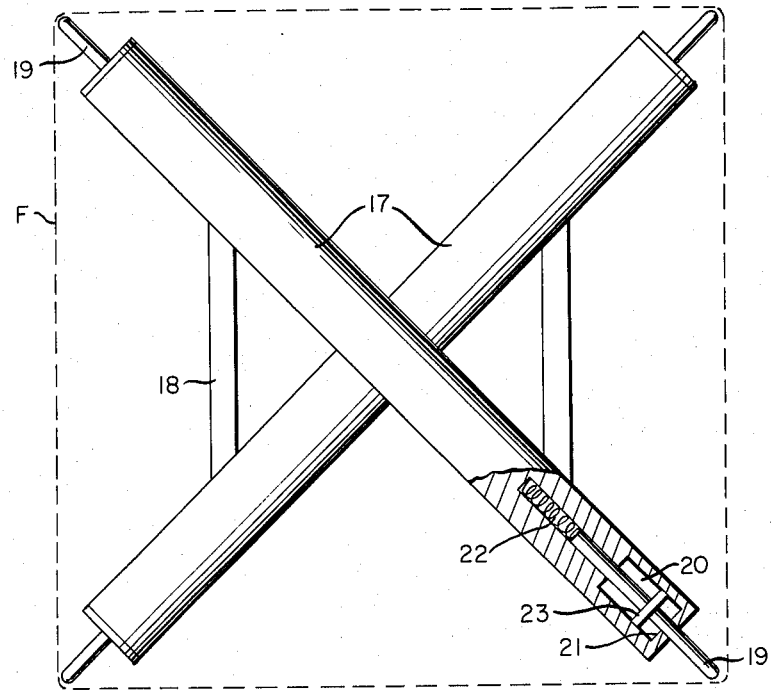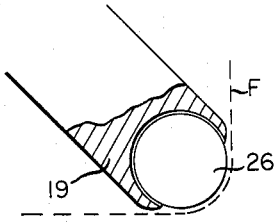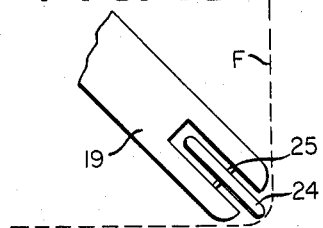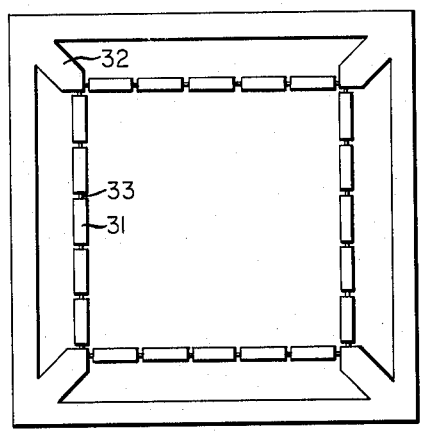

United States Patent Office 3,258,516
Patented June 28, 1966

3,258,516
PRODUCTION OF POLYMERIC FILM
Robert Wickliffe Ewing, Jr., Wilmington, Del., assignor to E. I. du Pont de Nemours and Company, Wilmington, Del., a corporation of Delaware
Filed Sept. 28, 1961, Ser. No. 141,384
10 Claims. (Cl. 264—209)

This invention relates to the manufacture of self-supporting film of polymeric material, and more particularly to improvements in methods and means for converting extruded continuous tubing from the inflated state to a substantially deflated flattened state.

In the manufacture of self-supporting polymeric films by tubular extrusion processes, one of the attendant problems plaguing the production of wrinkle and crease-free film of uniform gauge occurs when the tubular film must be collapsed to a "lay-flat" condition, following which it is customarily wound up on a suitable core as flat tubing or is slit and wound up as flat film on a plurality of suitable cores.

Creasing and wrinkling which occurs when collapsing thermoplastic tubing is caused by stress concentrations which are developed in the thermoplastic material because of the difference in distances that various elements (longitudinal lanes) around the circumference of the tubing must travel as the tubing is collapsed to a "lay-flat" condition. Wind-up tensions tend to be concentrated in some elements and, if tensions are high enough and the polymeric material sufficiently plastic, longitudinal stretching of these elements may result in lanes thinner than the desired nominal thickness. Other elements of the tubing are subjected to considerably lower winding tensions and, as a consequence, are slack and may appear as a bulge or a "barreling" in the otherwise flat profile of the wound-up mill roll. These areas of the film tend to be badly wrinkled, which wrinkles develop into creases under the mounting pressures of superimposed layers of film in the mill roll. Moreover, in the production of slit rolls of flat film from mill rolls exhibiting "barreling" (from whatever cause), many slit rolls are rejected as unsalable for a variety of reasons including hard and/or soft edges, telescoping, poor sheet flatness and lack of flat profile due to wrinkling.

The following techniques have been proposed and practiced in the prior art to minimez the effect of these lane length differences.

(1) Extremely slow wind-up speeds in combination with very low winding tension.

(2) Increasing the ratio of the *axial distance* from the point at which the tubing begins to collapse from a circular cross section to the point at which it reaches the "lay-flat" condition *to* the *diameter of the circular cross section.*

(3) In the case of molecularly oriented polymeric tubing which has not been completely heat-set, heating of the tubular film during collapsing has been proposed to permit differential shrinkage of the longer lane lengths.

The first attempt at solution offered above has obvious economic disadvantages. The second can only succeed completely where the axial distance over which collapsing occurs is of infinite length, and even practical success requires excessively long collapsing distances. The physical lengthening of the distance over which the tubing collapses, whether in a vertically or horizontally integrated manufacturing process, adds greatly to the cost of structures designed to house and/or support the manufacturing apparatus. The third proposal produces film having lanes thicker than the desired nominal thickness, such gauge differences resulting in unacceptable mill roll formation on wind-up.

A primary object of this invention, therefore, is to provide an improved process and means for collapsing continuous polymeric tubing to the "lay-flat" condition which obviate the operational difficulties above outlined. A further object is to provide a simple and economical process and apparatus for flattening continuous tubular polymeric film in crease- and wrinkle-free condition and at commercially acceptable speeds of production. The foregoing and related objects will more clearly appear from the description which follows.

These objects are realized by the present invention which, briefly stated, comprises in the process comprising, in combination, the steps of continuously forming a continuous tubing of a self-supporting film of polymeric material, said tubing having a circular cross section and continuously converting said tubing to a flattened condition consisting solely of two plies of film over the entire width of the flattened tubing; the improvement which comprises continuously converting the tubing from the circular cross section to an essentially rectangular cross section by means of suitable guide or shaper means, prior to converting said tubing to the flattened condition, the periphery of said essentially rectangular cross section being substantially equal to that of said circular cross section, the line bisecting said rectangular cross section into two rectangles having contiguous longer sides being parallel to the line perpendicular to the longitudinal axis of said tubing at which line said tubing attains a flattened condition.

The process of this invention is generic to the collapsing of any tubular polymeric sheet from a circular cross section to a "lay-flat" condition without regard to:

(1) the specific means by which the tubular sheet is produced;

(2) whether or not the tubular sheet is stretched;

(3) if stretched, whether by drawing over a mandrel or by expanding by fluid pressure means; or (4) whether the film is to be wound up on a single core as flat tubing or is to be first slit and then wound up as separate flat films on a plurality of cores.

The invention will be hereinafter described with reference to the accompanying drawings wherein:

FIG. 5 illustrates, partly in cut-away cross section, an alternative design for an internal shaper;

FIGS. 5a and 5b illustrate alternative film-contacting elements for the shaper shown in FIG. 5;

FIG. 7 illustrates still another design of an external shaper.

Figure 1:
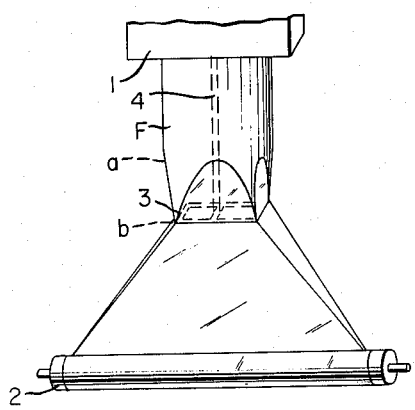
FIG. 1 is a perspective view illustrative of one application of the invention employing internal shaping or guide means.

Referring to FIG. 1, thermoplastic polymeric material (source not shown) is extruded from annular die 1 and, after cooling (by conventional means not shown) during which some neck-in occurs, forms self-supporting polymeric film F having a circular cross section. As the film is advanced by wind-up roll 2 (drive not shown), its cross sectional shape is changed from a circle at *a* to, in this instance, a square at *b* having essentially the same periphery as the circle at *a*, by drawing it over square shaper 3 supported internally of tubular film F by supporting arm 4 which is, in turn, supported by the core of annular die 1.

Figure 2:
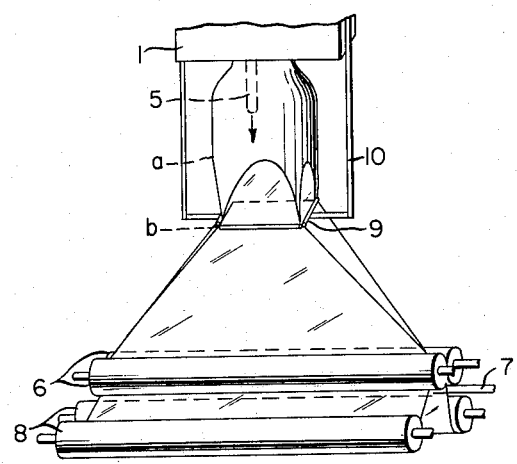
FIG. 2 is a view, in perspective, illustrative of another application of the invention employing shaping or guiding means located externally of the tubing.

In the embodiment of the process of this invention shown in FIG. 2 thermoplastic polymeric material (source not shown) is extruded from annular die 1 as a tubular film F and is immediately expanded by gaseous pressure (source not shown) supplied through pipe 5. As the tubular film is advanced between idling nip rolls 6 and past slitting knives 7 by wind-up rolls 8, its cross sectional shape is changed from a circle at $a$ to a square at $b$ having essentially the same periphery as the circle at $a$ by drawing it through square shaper 9 supported externally of tubular film F by support arms 10 which are, in turn, suitably supported by annular die 1.

With reference to the design of the shaper itself, i.e., the mechanical device which causes the film to assume an essentially rectangular cross sectional shape prior to collapsing to a flattened condition many variations are permissible depending on whether the shaper is to be positioned within or outside of the tubular sheet and also on the means by which the shaper is to be supported. For purposes of illustration, the shapers are shown in the preferred square configuration. When shapers are employed which define essentially rectangular cross sections that are longer than they are wide, it has been found that best results are obtained when the length-to-width ratio of said essentially rectangular cross section does not exceed about 7 to 2.

Figure 3:
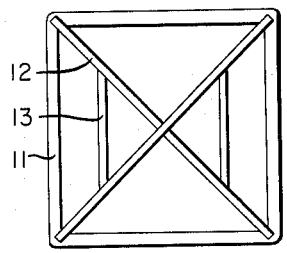
FIG. 3 depicts in elevation a design for an internal shaper.
Figure 4:
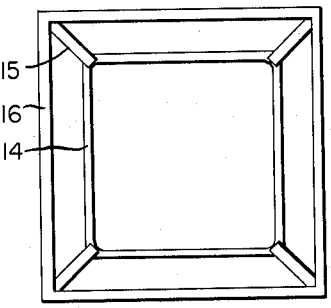
FIG. 4 illustrates a design for an external shaper.

FIGS. 3 and 4 illustrate relatively simple designs for an internal and an external shaper respectively. In FIG. 3 square frame 11, made preferably of lightweight metal having slightly rounded corners and edges (to reduce drag and to prevent scratching of the film), is secured to bracing members 12 and 13 to which, in turn, may be fastened suitable supporting means (not shown). In FIG. 4, square frame element 14, also constructed of a light metal is attached thru elements 15 to an outer bracing frame 16 supported in a suitable fashion (not shown).

FIGS. 5, 5a, 5b and 6 show refinements in the design of internal shapers permitting savings in weight which may be reflected in less rugged supporting means.

It is not necessary that the structural members of internal shapers actually define the square or rectangular cross section as with the sides of a box. For example, the rollers of the internal shaper shown in FIG. 6 serve as but two sides of such a box while the cross sectional defining members of the internal shapers shown in FIGS. 5, 5a, and 5b merely indicate the "corners" of the desired cross section.

In FIG. 5, lightweight rods 17 of equal length are fastened together at their respective mid-points, being maintained in mutually perpendicular configuration by bracing members 18. Tubular film F, shown as a dashed line, is maintained in essentially square cross section by sliding contact over the rounded ends of round-nosed cylindrical pins 19. Referring to the cutaway view, drawn partly in section, each pin 19 is slidably mounted in the smaller diameter portion of cylindrical chamber 20 and plate 21, both chamber 20 and plate 21 being concentric with the axis of rod 17. Spring 22, located in the smaller diameter portion of chamber 20, continually urges pin 19 outward of chamber 20, through plate 21 and into contact with tubular film F, pin 19 being restrained from exiting chamber 20 by contact of circular flange 23 with plate 21. Optionally, in lieu of spring 22, pneumatic or hydraulic means may be employed to urge pin 19 into contact with film F.

If it is desired to further reduce frictional drag between the tubular sheet and the shaper, the rounded end of each pin 19 may be slotted and fitted with small idler wheel 24 mounted to rotate freely about axle 25 in response to rolling contact between moving tubular film F and the periphery of wheel 24, as shown in the expanded view in FIG. 5a. Alternatively, the rounded end of each pin 19 may be provided with a frusto-spherical socket, suitably lined with material of low coefficient of friction, for retaining ball 26 of material of low coefficient of friction, said ball being free to rotate within said socket in response to rolling contact between moving tubular film F and the periphery of ball 26, as shown in the expanded view in FIG. 5b.

Figure 6:
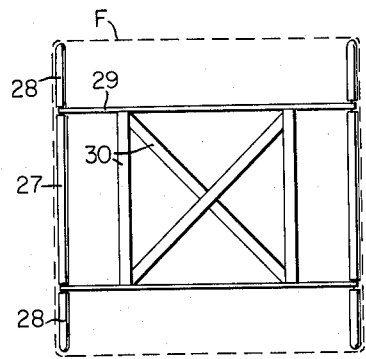
FIG. 6 illustrates still another design of an internal shaper.

In FIG. 6, highly polished, segmented idler rollers of equal length, each consisting of one relatively long central roll section 27 and two relatively short terminal roll sections 28, the outermost ends of roll sections 28 being rounded, roll section 27 and roll sections 28 being mounted to rotate freely about the same axle are held apart in mutually parallel configuration by spacer bars 29 of equal length cooperating with bracing members 30 so that tubular film F, shown as a dashed line, is maintained in essentially square cross section by rolling contact thereof with idler roll sections 27 and 28.

FIG. 7 shows a refinement in the design of an external square shaper wherein highly polished, multi-segmented idler rollers 31 of equal length are held in square configuration by bracing members 32, the roll segments of each idler roller 31 being maintained to rotate freely about the same axle 33.

Whether or not the axial distance (over which collapsing from circular cross section to "lay-flat" occurs) is fixed by plant structure or is free to be varied widely, in positioning a rectangular or square shaper intermediate of the circular cross section and the line at which the flattened condition is attained, i.e., the "flat line," it is preferred to position the shaper relatively farther from the circular cross section and closer to the "flat line."

The following examples are merely further illustrative of the process of this invention and are not intended to be limiting in any way.

*Example 1*

A collapsed tubular sheet of polyethylene of circular cross section was continuously produced by extruding molten pylyethylene from an annular die, cooling and stretching the sheet while expanding it to a diameter of 33 inches by the application internally of air pressure, and collapsing the tubular sheet from a circular cross section to a "lay-flat" state over an axial distance of 16 feet by drawing said sheet between and over flattening rolls. The flattened tubular film was thereafter slit to form two flat sheets of nominally one-mil thick polyethylene film which were wound on separate 10-inch O.D. cores. The resulting mill rolls (Control A) showed pronounced "barreling," i.e., an average of 0.03 inch per inch of film built up radially on the core. In other words, when winding one-mil polyethylene film on a 10-inch O.D. core to a total outside diameter of 20 inches, there is 5 inches of film built up radially. Multiplying $0.03 \times 5$ and adding the core radius (5 inches) plus radial film build-up (5 inches) gives a radius in the central portion of the mill roll of 10.15 inches, constrasted with a radius near the ends of the mill roll of slightly less than 10 inches. In the production of slit rolls from the two mill rolls produced from this tubing about 5% were rejected for one or more reasons including hard and/or soft edges, telescoping, poor sheet flatness and lack of flat profile due to wrinkling.

When the axial distance over which the film was collapsed directly from a circular cross section to the "lay flat" state was shortened to 6 feet (Control B), "barreling" was much more severe, an average of about 0.21 inch per inch of film built up radially on the core. No satisfactory slit rolls were produced.

While employing an axial distance of 6 feet, an internal square shaper of the design shown in FIG. 6 was positioned within the tubular sheet at an axial distance from the circular cross section of about 9.5 inches and with its two roller members parallel to the "flat line." The shaper was supported by rigid bracing members attached to the structure serving to support the flattening guide rolls and slitting knives. The periphery of the essentially square cross section of the tubular film was slightly less than that of the circular cross section, the square shaper having been designed to allow for the slight amount of peripheral shrinkage exhibited by the tubular sheet. The degree of "barreling" was comparable to that encountered when collapsing over a distance of 16 feet without the aid of an internal square shaper. The percent slit roll rejects for the above-mentioned reasons was also about the same as for Control A.

*Example 2*

Following the procedure of Example 1, the internal shaper employed above was positioned 21 inches from the circular cross section with its two roller members parallel to the "flat line," while still maintaining the axial distance over which the film collapsed at 6 feet. "Barreling" was not noticeable in either mill roll, only being detectable by measurement as less than 0.01 inch per inch of film built up on the 10 inch O.D. core when winding to a total outside diameter of 20 inches. No slit rolls were rejected for the above-mentioned reasons.

*Example 3*

A tubular sheet was continuously formed as in Example 1 and was collapsed from a circular cross section to the "lay flat" state over an axial distance of 16 feet with the internal square shaper employed in Examples 1 and 2 positioned 10 feet from the circular cross section. "Barreling" was not noticeable in either mill roll, nor was it detectable by the most careful measurement. There were no slit roll rejects for the above-mentioned reasons.

*Example 4*

Following the procedure employed for Examples 1, 2 and 3, a tubular sheet of polyethylene of circular cross section was continuously produced by melt extruding from an annular die, cooling and stretching the sheet while expanding it to a diameter of 40 inches by the application internally of air pressure collapsing the tubular sheet from a circular cross section to a flattened state over an axial distance of 14 feet by drawing said sheet between and over flattening rolls, past slitting knives, and winding up the two separate flat, nominally 1-mil thick polyethylene films on separate 10-inch O.D. cores. The resulting mill rolls (Control C) showed pronounced "barreling." In the production of slit rolls from the two mill rolls produced from this tubing, over 12% were rejected for one or more reasons including hard and/or soft edges, telescoping, poor sheet flatness and lack of flat profile due to wrinkling.

When the axial distance over which the film was collapsed directly from a circular cross section to the "lay flat" state was shortened to 6 feet (Control D), "barreling" was so severe that no satisfactory slit rolls were produced.

While employing an axial distance of 6 feet, an internal square shaper of the design shown in FIG. 6 was positioned within the tubular sheet at an axial distance from the circular cross section of about 24 inches and with its two roller members parallel to the "flat line." The shaper was supported as in Example 1. The periphery of the essentially square cross section of the tubular sheet was slightly less than that of the circular cross section, the square shaper having been designed to allow for the slight amount of peripheral shrinkage exhibited by the tubular sheet. Somewhat less "barreling" was encountered on wind-up and slit roll rejects for the above-mentioned reasons were reduced to less than 7%.

*Example 5*

Following the procedure of Example 4, the tubular sheet was collapsed from a circular cross section to the "lay flat" state over an axial distance of 14 feet, with the internal square shaper employed in Example 4 positioned 10 feet from the circular cross section with its two roller members parallel to the "flat line." "Barreling" was not noticeable in either mill roll nor was it detectable by the most careful measurement. There were no slit roll rejects for the above-mentioned reasons.

*Example 6*

Following the procedure employed for Examples 1–5, a tubular sheet of polyethylene of circular cross section was continuously produced by melt extruding from an annular die, cooling and stretching the sheet while expanding it to a diameter of 47 inches by the application internally of air pressure, collapsing the tubular sheet from a circular cross section to a flattened state over an axial distance of 18 feet by drawing said sheet between and over flattening rolls, past slitting knives, and winding up two separate flat, nominally 1-mill thick polyethylene films on separate 10-inch O.D. cores. The resulting mill rolls showed rather severe "barreling" and slit roll rejects for the above-mentioned reasons exceeded 22%.

While still maintaining the axial distance over which the film collapsed at 18 feet, an internal rectangular shaper having a length of 50⅝ inches and a width of 22⅞ inches, was positioned within the tubular sheet at an axial distance from the circular cross section of 15.5 feet and with the longitudinal axis of symmetry of the essentially rectangular cross section parallel to the "flat line." "Barreling" was much less pronounced and slit roll rejects for the above-mentioned reasons were reduced to less than 10%.

*Example 7*

Following the procedure of Example 6 while maintaining the axial distance over which the film collapsed at 18 feet, an internal square shaper of the design shown in FIGS. 5 and 5b was positioned within the tubular sheet at an axial distance from the circular cross section of 14 feet. The shaper was supported by rigid bracing members attached to the structure serving to support the flattening guide rolls and slitting knives, and was so positioned that two sides of the essentially square cross section of the tubular film were parallel to the "flat line." As before, the periphery of the essentially square cross section of the tubular film was slightly less than that of the circular cross section, a small allowance for peripheral shrinkage having been made. "Barreling" was not noticeable in either mill roll, nor was it detectable by the most careful measurement. There were no slit roll rejects for the above-mentioned reasons.

It should be apparent from the foregoing examples that the use of the rectangular or square shapers in accordance with the process of this invention permits the collapsing of tubular films over extremely short axial distances which, without the use of the invention, would result in intolerable mill roll formation with attendant film waste.

I claim:

1. In the manufacture of polymeric film comprising, in combination, the steps of continuously forming a continuous tubing of a self-supporting film of polymeric material, said tubing having a circular cross section, and continuously converting said tubing to a deflated flattened condition consisting solely of two plies of film over the entire width of the flattened tubing; the improvement which comprises continuously converting the tubing from the circular cross section to an essentially rectangular cross section prior to converting said tubing to the flattened condition, the rectangular cross section having a length to width ratio within the range of from about 1 to 1 to about 7 to 2, the periphery of said rectangular cross section being substantially equal to that of said circular cross section, the line bisecting said rectangular cross section into two rectangles having contiguous longer sides being parallel to the line perpendicular to the longitudinal axis of said tubing at which line said tubing attains a flattened condition.

2. The process of claim 1 wherein said rectangular cross section has a length-to-width ratio of substantially 1 to 1.

3. In the manufacture of polymeric film comprising, in combination, the steps of continuously melt extruding a continuous tubing of thermoplastic polymeric material said tubing having a circular cross section, continuously passing said tubing thru a cooling zone effective to render said film self-supporting, continuously converting said tubing to a deflated flattened condition consisting solely of two plies of film over the entire width of the flattened tubing, and thereafter continuously winding up said plies of film; the improvement which comprises continuously converting the tubing of self-supporting film from the circular cross section to an esesntially rectangular cross section prior to converting said tubing to the flattened condition, the rectangular cross section having a length to width ratio within the range of from about 1 to 1 to about 7 to 2, the periphery of said rectangular cross section being substantially equal to that of said circular cross section, the line bisecting said rectangular cross section into two rectangles having contiguous longer sides being parallel to the line perpendicular to the longitudinal axis of said tubing at which line said tubing attains a flattened condition.

4. The process of claim 3 wherein said flattened tubing is continuously slit at each side edge to form two sheets of film.

5. The process of claim 4 wherein said sheets are separately wound up.

6. The process of claim 3 wherein said rectangular cross section has a length-to-width ratio of substantially 1 to 1.

7. In apparatus for the manufacture of film comprising, in combination, means for continuously forming a continuous tubing of a self-supporting film of polymeric material said tubing having a circular cross section, and means for continuously converting said tubing to a deflated flattened condition consisting solely of two plies of film over the entire width of said flattened tubing; the improvement which comprises shaping means adapted to continuously convert said tubing from the circular cross section to an essentially rectangular cross section before said tubing is converted to the flattened condition, the rectangular cross section having a length to width ratio within the range of from about 1 to 1 to about 7 to 2, the periphery of said rectangular cross section being substantially equal to that of said circular cross section, the line bisecting said rectangular cross section into two rectangles having contiguous longer sides being parallel to the line perpendicular to the longitudinal axis of said tubing at which line said tubing attains a flattened condition.

8. In apparatus for the manufacture of film comprising, in combination, means for continuously melt extruding thermoplastic polymeric material in the form of a continuous extruded tubing having a circular cross section, means for continuously cooling said extruded tubing to render said tubing self-supporting, means for continuously converting said self-supporting tubing to a flattened tubing consisting solely of two plies of film over the entire width of said flattened tubing, and roll means for continuously winding up said plies of film; the improvement which comprises shaping means adapted to continuously convert said tubing from the circular cross section to an essentially rectangular cross section before said tubing is converted to the flattened condition, the rectangular cross section having a length to width ratio within the range of from about 1 to 1 to about 7 to 2, the periphery of said rectangular cross section being substantially equal to that of said circular cross section, the line bisecting said rectangular cross section into two rectangles having contiguous longer sides being parallel to the line perpendicular to the longitudinal axis of said tubing at which line said tubing attains a flattened condtion.

9. The appartus of claim 8 wherein said shaping means is located interiorly of said tubing.

10. The apparatus of claim 8 wherein said shaping means is located exteriorly of said tubing.

References Cited by the Examiner

UNITED STATES PATENTS

| | | | |
|---|---|---|---|
| 2,559,386 | 7/1951 | Bailey | 18—14 |
| 2,631,332 | 3/1953 | Reber | 18—14 |
| 2,668,324 | 2/1954 | Johnson | 18—14 |
| 2,720,680 | 10/1955 | Gerow | 18—14 |
| 3,065,097 | 11/1962 | Zupic et al. | 18—14 |

FOREIGN PATENTS

| | | |
|---|---|---|
| 599,939 | 8/1961 | Belgium. |
| 744,977 | 2/1956 | Great Britain. |

ALEXANDER H. BRODMERKEL, *Primary Examiner.*

WILLIAM STEPHENSON, *Examiner.*

L. S. SQUIRES, J. R. DUNCAN, B. SNYDER,
*Assistant Examiners.*